(12) United States Patent
Yue et al.

(10) Patent No.: US 6,665,402 B1
(45) Date of Patent: Dec. 16, 2003

(54) METHOD AND APPARATUS FOR PERFORMING ECHO CANCELLATION

(75) Inventors: H. S. Peter Yue, St. Laurent (CA); Sylvain Angrignon, Nun's Island (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/386,281

(22) Filed: Aug. 31, 1999

(51) Int. Cl.$^7$ .............................. H04M 9/08; H04B 3/20; H04B 15/00

(52) U.S. Cl. .............................. 379/406.04; 379/406.01; 379/406.05; 370/286; 370/287; 455/63; 455/296

(58) Field of Search ..................... 379/406.01, 406.03, 379/406.04, 406.05, 406.07, 406.08, 394; 370/286, 287, 289; 455/63, 296

(56) References Cited

U.S. PATENT DOCUMENTS

| | | | | |
|---|---|---|---|---|
| 4,558,187 A | * | 12/1985 | Billi et al. ................... 379/402 |
| 4,782,525 A | * | 11/1988 | Sylvain et al. ......... 379/406.08 |
| 5,530,724 A | * | 6/1996 | Abrams et al. ............. 375/345 |
| 5,559,881 A | * | 9/1996 | Sih ............................ 379/410 |
| 5,570,423 A | * | 10/1996 | Walker et al. ............... 379/410 |
| 5,631,958 A | * | 5/1997 | Reese et al. ........... 379/406.06 |
| 5,687,229 A | * | 11/1997 | Sih ............................. 379/410 |
| 6,088,445 A | * | 7/2000 | Chadha et al. .............. 379/411 |
| 6,125,179 A | * | 9/2000 | Wu ............................ 379/388 |
| 6,134,224 A | * | 10/2000 | Reese et al. ................ 370/286 |
| 6,163,608 A | * | 12/2000 | Romesburg et al. ........ 379/410 |
| 6,282,176 B1 | * | 8/2001 | Hemkumar ................. 370/276 |
| 6,351,531 B1 | * | 2/2002 | Tahernezhaadi et al. ..................... 379/401.01 |
| 6,400,802 B1 | * | 6/2002 | Legare ......................... 379/3 |
| 6,430,162 B1 | * | 8/2002 | Reese et al. ................ 370/286 |
| 6,507,652 B1 | * | 1/2003 | Laberteaux ............ 379/406.05 |
| 6,507,653 B1 | * | 1/2003 | Romesburg et al. ... 379/406.05 |

* cited by examiner

Primary Examiner—Binh Tieu

(57) ABSTRACT

An echo cancellation device for reducing a magnitude of an echo occurring in a voice signal propagating in a channel of a communication system. The echo cancellation device is capable to selectively acquire an active operative mode and an inactive operative mode in response to a condition indicative of a level of echo present in the voice signal. In the active operative mode the echo cancellation device performs echo cancellation on the voice signal. In the inactive operative mode the echo cancellation device allows the voice signal to propagate without performing any echo cancellation.

12 Claims, 3 Drawing Sheets

METHOD AND APPARATUS FOR PERFORMING ECHO CANCELLATION

FIELD OF THE INVENTION

The present invention relates to the field of signal processing. More specifically, it pertains to a method and apparatus for performing echo cancellation that finds applications in digital mobile systems, such as CDMA wireless systems, among other possibilities.

BACKGROUND OF THE INVENTION

A common issue within telecommunication networks is the echo that arises as a result of transmitted signals being coupled into a return path and fed back to the respective sources. The most common cause of the coupling is an impedance mismatch at a four-wire to two-wire hybrid. The impedance mismatches cause signals in the incoming branch of a four-wire circuit to get coupled into the outgoing branch and return to the source. A standard form of echo control is echo cancellation. Echo cancellers operate by modeling the echo path to subtract a properly delayed and attenuated copy of a transmitted signal from the receive signal to attenuate (cancel) echo components. Generally, echos are canceled close to the source so that delays in the echo canceller are minimized.

Telephone companies traditionally deploy echo cancellers only in long distance toll circuits. In the advent of digital mobile (digital cellular phone) technology, the typical round trip delay of such digital mobile systems is around 200 ms due to the digital processing delays of each element (e.g. speech encoding/decoding, data packetizing, etc) along the path. The length of the delay introduced by the digital mobile systems is comparable to that of a long distance call. Echo cancellers are therefore needed in the base stations of the digital mobile systems even for local (as opposed to long distance) call applications.

In general, traditional echo cancellers perform well in digital mobile systems; however, there is one important scenario that is unique to digital mobile systems and does not exist in traditional landline circuits. This scenario is the call characterized by a lack of hybrid along the entire signal path, such as in the case of a call from a digital mobile to a digital mobile or from a digital mobile to a digital PBX termination. Unfortunately, the traditional echo canceller designs do not perform well under no-hybrid conditions because the echo canceller is designed to cancel echo. Specifically, when there is: no hybrid and thus no echo being generated, traditional echo cancellers are generally known to cause spurious echo and unpleasant speech clipping over the communication channel.

The background information herein clearly shows that there exists a need in the industry to provide an improved method and apparatus for performing echo cancellation, particularly in situations where the signal path may be such that in some instances echo is present while in other instances echo is absent.

SUMMARY OF THE INVENTION

The present invention is directed to an echo cancellation device for performing echo cancellation on a voice signal that can acquire an inactive operative mode when a certain condition exists, the condition indicating that no audible echo is present in the voice signal. In a first example of implementation, the condition is the actual level of echo in the voice signal. When the level of echo is low or non-existent the echo cancellation device acquires the inactive operative mode and allows the propagation of the voice signal without performing any echo cancellation. In a second example of implementation the condition that reflects the level of echo is the type of connection between the terminals involved in the voice call. Some types of connections are inherently substantially echo-free. This is the case of a digital mobile to a digital mobile connection or a digital mobile to a digital PBX (Private Branch Exchange) termination connection. When the echo cancellation device determines that an echo-free connection is being established, it acquires the inactive operative mode.

Under the first example of implementation, the echo cancellation device receives both a near-end voice signal and a far-end voice signal from a channel in a communication system, and includes an echo cancellation unit and a control unit. The near-end voice signal is the potentially echo-corrupted voice signal while the far-end voice signal is the precursor of the echo in the near-end voice signal. The echo cancellation unit is responsible for processing the far-end voice signal to reduce a magnitude of an echo occurring in the near-end voice signal, in order to generate an echo-attenuated voice signal. The control unit is responsible for assessing a level of echo in the near-end voice signal and is responsive to a condition in which the level of echo in the near-end voice signal is below a certain threshold to cause the near-end voice signal to be released from the output of the echo cancellation device.

By setting the echo cancellation device in the inactive operative mode when echo is not present in the communication channel, the echo cancellation device will not attempt to cancel echo where there is none, the latter causing spurious echo and unpleasant speech clipping in the communication channel. Thus, the quality of speech transmission provided in the communication channel is greatly improved.

Throughout the specification, the term "hybrid" is used to refer to any physical mechanism causing electrically generated echo, such as an impedance mismatch between two wires.

BRIEF DESCRIPTION OF THE DRAWINGS

These and other features of the present invention will become apparent from the following detailed description considered in connection with the accompanying drawings. It is to be understood, however, that the drawings are provided for purposes of illustration only and not as a definition of the boundaries of the invention, for which reference should be made to the appending claims.

DETAILED DESCRIPTION

Figure 1:
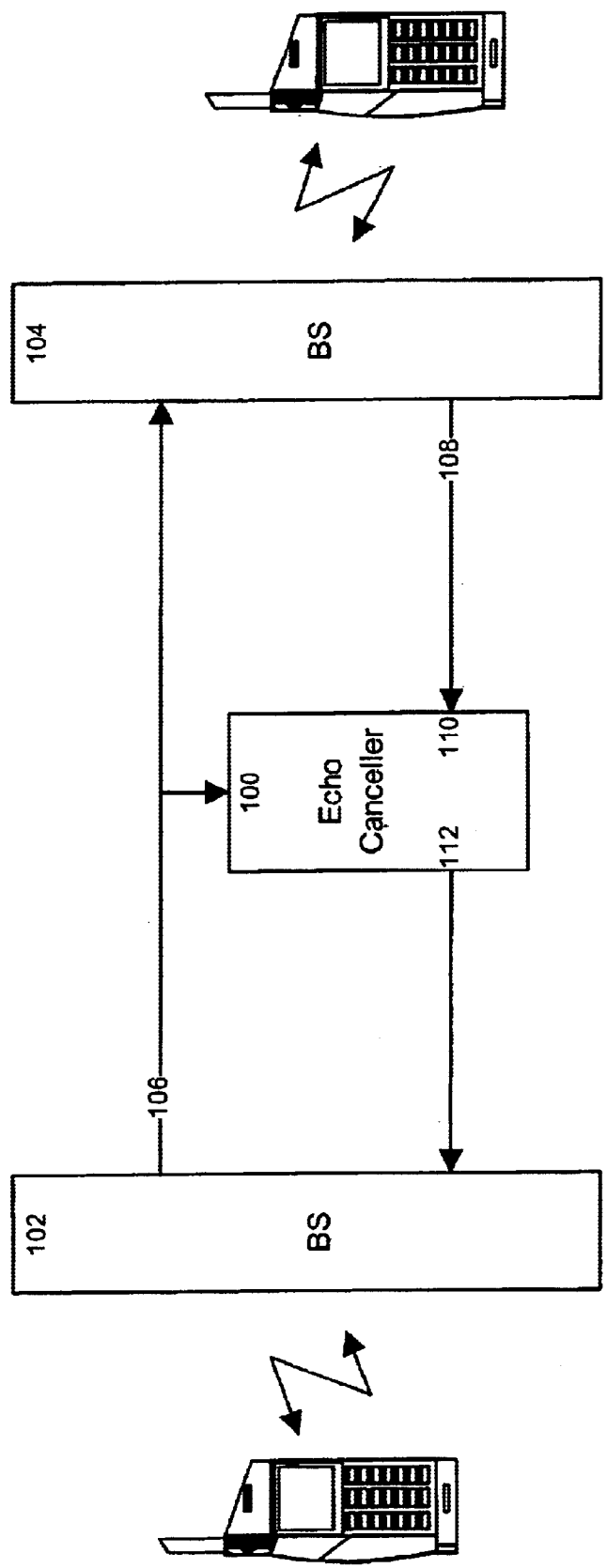
FIG. 1 is a block diagram of a mobile-to-mobile connection including an echo cancellation device, in accordance with a first embodiment of the present invention.

In digital mobile systems, the scenario of a mobile-to-mobile call is becoming more and more likely as the number of mobile phone subscribers increases. According to one example of implementation of the present invention, such a mobile-to-mobile connection includes an echo cancellation device, hereinafter referred to as an echo canceller, as shown in FIG. 1. The far-end voice signal 106 is transmitted from Base Station (BS) 102 to BS 104, independent of the echo canceller 100. The near-end signal 108 is transmitted from BS 104 to an input 110 to the echo canceller 100, and is received at the BS 102 from an output 112 of the echo canceller 100. Note that in the situation where echo is present over a connection, the "near-end voice signal" designates the echo-corrupted voice signal while the "far-end voice signal" designates the precursor of the echo in the near-end voice signal. As will be described in further detail below, the echo canceller 100 provides for the situation in which there is no hybrid over the connection, such as in the mobile-to-mobile connection of FIG. 1, whereby the near-end voice signal is free of audible echo.

Traditional echo cancellers, widely deployed nowadays, use the Least Mean Square (LNMS) algorithm to effect echo cancellation. The LNS algorithm consists in two parts, namely, adaptation:

$$h_i[n+1]=h_i[n]+kx[n-i]e[n] \quad (EQ\ 1)$$

and cancellation:

$$e[n]=y[n]-\Sigma_{i=0}^{N-1}hix[n-i] \quad (EQ\ 2)$$

where $h_i$ is the echo canceller coefficient, k is the adaptation gain, x is the far-end signal, e is the residual echo and y is the near-end signal that contains the echo.

The process of cancelling echo involves two steps. First, as the call is set up, the echo canceller employs a digital adaptive filter (adaptation) to set up a model or characterization of the voice signal and echo passing through the echo canceller, thus generating an echo estimate signal. As a voice oath passes back through the cancellation system, the echo canceller compares the signal and the model to cancel existing echo dynamically (cancellation). This process removes more than 80 to 90 percent of he echo across the network. The above-described LMS algorithm tries to adapt the filter coefficients so as to minimize the residual echo energy. Given that the functionality of the LMS algorithm with respect to echo cancellation, including the concepts of adaptation and cancellation, are swell known to those skilled in the art, they will not be described in further detail. The second step of cancelling echo utilizes non-linear processing to eliminate the remaining residual echo by attenuating the signal below the noise floor.

According to the present invention, the echo canceller 100 can selectively acquire one of two modes of operation, specifically an active operative mode and an inactive operative mode. In the active operative mode, normal echo cancellation operation takes places and the far-end voice signal is processed to perform echo cancellation on the near-end voice signal, such that an echo-attenuated voice signal is generated. In the inactive operative mode, the echo canceller 100 allows the propagation of the near-end voice signal without performing any echo cancellation thereto. The echo canceller 100 is responsive to a particular condition indicative of the level of echo occurring in the near-end voice signal o acquire either the active or inactive operative mode, as will be described in further derail below.

Figure 2:
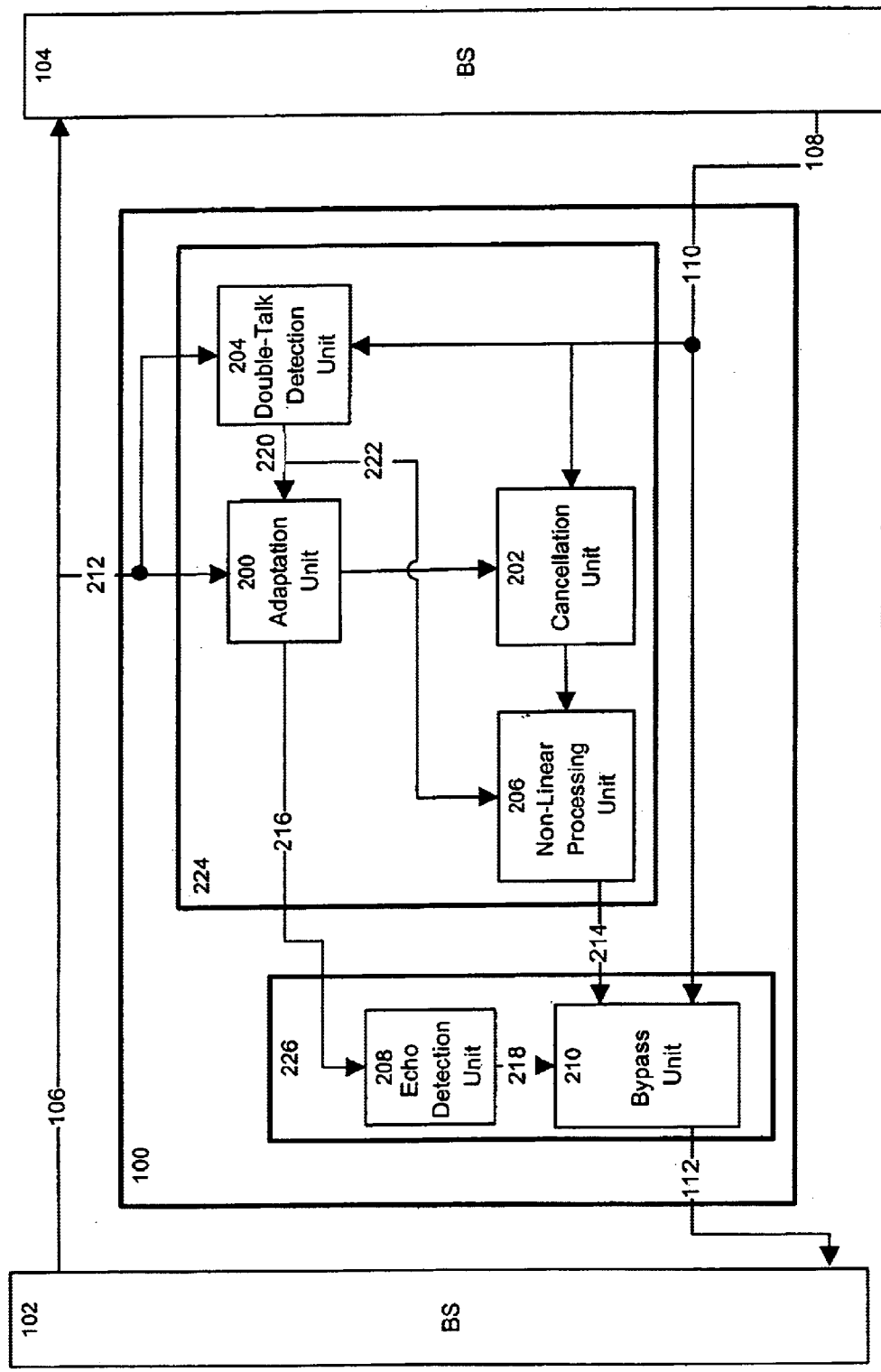
FIG. 2 is a functional block diagram of the echo cancellation device shown in FIG. 1.

A functional block diagram of the echo canceller 100 is shown in FIG. 2, according to a preferred embodiment of the present invention. Note that in FIGS. 1 and 2, the echo canceller 100 is shown in use over a mobile-to-mobile connection. However, the use of the echo canceller 100 is not limited to such a connection, but rather may be used to perform echo cancellation over a variety of different types of connections, such as digital mobile-to-digital PBX termination connections and digital mobile-to-landline connections, among others.

The echo canceller 100 includes an echo cancellation unit 224 responsible for performing traditional echo cancellation. The echo cancellation unit 224 includes an adaptation unit 200 and a cancellation unit 202, responsible for implementing the above-described LMS algorithm. The echo cancellation unit 224 also includes a non-linear processing unit 206, coupled to the cancellation unit 202 for performing non-linear processing of the echo-cancelled signal, such as center-clipping, in order to eliminate any residual echo. It is riot deemed necessary to discuss the operation of these functional units in more detail because it is well known to those skilled in the art and is not critical to the success of the present invention.

The echo cancellation unit 224 also includes a double-talk detection unit 204, where double-talk is a condition whereby both far-end and near-end speakers talk simultaneously. The double-talk detection unit 204 is responsible for minimizing the chances of the echo canceller 100 mistaking the near-end speech for echo, a well-known common occurrence in echo cancellers. The double-talk detection unit 204 receives as inputs and monitors both the far-end signal 106, input to the echo canceller 100 at input 212, and the near-end signal 108, input to the echo canceller 100 at input 110. In a particular example, if double-talk is detected, then the double-talk detection unit 204 sends a Suspend control signal to the adaptation unit 200 over link 220 and to the ion-linear processing unit 206 over link 222 such that adaptation and non-linear processing are suspended. When the double-talk detection unit 204 determines that double-talk has ceased an Enable control signal is sent over links 220 and 222 such that adaptation and non-linear processing resume. The cancellation performed by the cancellation unit 202 is never turned off. Since the use of double-talk detection in echo cancellers is well known to those skilled in the art and is not critical to the success of the present invention, it will not be described in further detail.

Specific to this example of implementation of the present invention, the echo canceller 100 includes a control unit 226 formed by an echo detection unit 208 and a bypass unit 210. The control unit 226 is responsible to ensure that the echo canceller 100 acquires the inactive operative mode in response to a condition indicating that the level of echo occurring in the near-end voice signal is below a certain threshold. Accordingly, the echo canceller 100 will not attempt to cancel echo where there is none. The control unit 226 also ensures that the echo canceller 100 acquires the active operative mode, such that normal echo cancellation operation takes place, in response to a condition that indicates that echo is present in the communication channel. In a particular example, a mobile-to-mobile call is established and the echo canceller 100 acquires the inactive operative mode. Should the call status change to a 3-way conference call between the two mobile phones and a land-line user, the echo caused by the hybrid is present in the communication channel and the control unit 226 ensures that the echo canceller 100 acquires the active operative mode.

In this example of Implementation of the present invention, the condition indicative of the level of echo occurring in the near-end voice signal to which the control unit 226, and thus the echo canceller 100, responds is the actual level of echo present in the near-end voice signal. An estimate of the magnitude of the level of echo in the near-end signal is continuously assessed by the control unit 226 and used to control the operative mode of the echo canceller 100.

An important property of the echo canceller coefficients is the fact that they correspond to an estimate of the impulse response of the echo path. In this example of implementation, the echo detection unit 208 and the bypass unit 210 will exploit this property in order to detect the absence of an echo-causing hybrid over the connection and to cause the echo canceller 100 to acquire the inactive operative mode. As shown in FIG. 2, the echo detection unit 208 receives as input the adapted signal from the adaptation unit 200 over link 216. The echo detection unit 208 is operative to extract the echo canceller coefficients $h_i$ from the adapted signal, and to determine the maximum (peak value) of the absolute value of these echo canceller coefficients. The peak-to-floor ratio is defined as follows:

$$h_{peak} = \max_{i=0}^{N-1}(|h_i|) \quad (EQ\ 3)$$

$$Peak - to - Floor\ Ratio = \frac{h_{peakk}^2 + h_{peakj}^2}{\sum_{\substack{i=0 \\ i \neq j,k}}^{N-1} h_i^2}, \quad (EQ\ 4)$$

where j, k are the indices corresponding to the two largest absolute peaks of the echo canceller coefficients $h_i$. After each iteration of filter adaptation (EQ 1) performed by the adaptation unit 200, the echo detection unit 208 will compute the peak-to-floor ratio according to EQ 3 and EQ 4 above, and send this peak-to-floor ratio as a control signal to the bypass unit 210, over link 218.

The bypass unit 210 acts as a switch and receives as inputs, in addition to the control signal from the echo detection unit 208 over link 218, the normal echo canceller output 214 from the echo cancellation unit 224 and the near-end voice signal 108 received at input 110 of the echo canceller 100. The bypass unit 210 is operative to compare the peak-to-floor ratio, received from the echo detection unit 208, to a pre-determined threshold level T1. If the peak-to-floor ratio is below the threshold level T1, a hysteresis counter C is incremented; else the counter C is reset. The bypass unit 210 determines that there is a NO HYBRID condition, and thus that the level of echo in the rear-end voice signal 108 is low enough to be considered absent, when the counter C reaches a pre-determined value T2. At this point, the normal echo canceller output 214 is bypassed. Specifically, the near-end signal 108 is passed directly from the bypass unit 210 to the output 112 of the echo canceller 100, for release from the echo canceller 100 and transmission to the BS 102, such that the echo canceller 100 acquires the inactive operative mode.

Note that until the value of counter C reaches T2, normal echo canceller output 214 is selected by the bypass unit 210 and passed to the output 112 of the echo canceller 100. During bypass of the echo canceller 100, the peak-to-floor ratio is being continuously updated by the hybrid detection unit 208 and monitored by the bypass unit 210 (i.e. compared to the threshold level T1). This allows for a possible change of status over the connection, such as the above example of a change in status from a mobile-to-mobile call to a 3-way conference call with a landline device, at which point the bypass unit 210 will switch such that the echo canceller 100 once again acquires the active operative mode.

In a different example of implementation of the present invention, the condition indicative of the level of echo occurring in the near-end voice signal to which the echo canceller 100 responds is the type of connection established over the communication channel. As mentioned above, the type of connection may be a digital mobile-to-mobile connection or a digital mobile-to-digital PBX termination connection, among others. In this example of implementation, the echo canceller 100 will exploit the well known "codec bypass" mechanism of digital communication systems, such as wireless networks, in order to determine the type of Connection. This codec bypass mechanism is useful to improve she audio quality of a voice signal communication exchanged over a wireless connection.

Taking for example the codec bypass mechanism as implemented in a digital mobile-to-mobile connection, when the codecs at the base stations are made aware of their mutual existence during the connection, they are switched off. This allows for encoded speech information arriving at the first base station to flow into encoded format through the PSTN and arrive as such at the second base station, thus eliminating unnecessary decoding and re-encoding operations at the base stations. The codec In one base station can switch to the bypass mode as a result of an in-band handshaking operation with the companion codec in the other base station. As a result, the audio quality is significantly improved.

For additional information on the "codec bypass" technique, the reader is invited to refer to the U.S. Pat. No. 5,768,308 granted to the same assignee that describes the process in great detail.

Specific to this different example of implementation of the present invention, when the codec bypass mode is acquired by a base station, this is indicative of a digital mobile-to-mobile connection and, as such, of a type of connection over which there is little to no echo. The base station is thus in a position to ensure that the echo canceller in use over the wireless connection acquires the inactive operative mode when necessary, specifically when the base station itself acquires the codec bypass mode.

Figure 3:
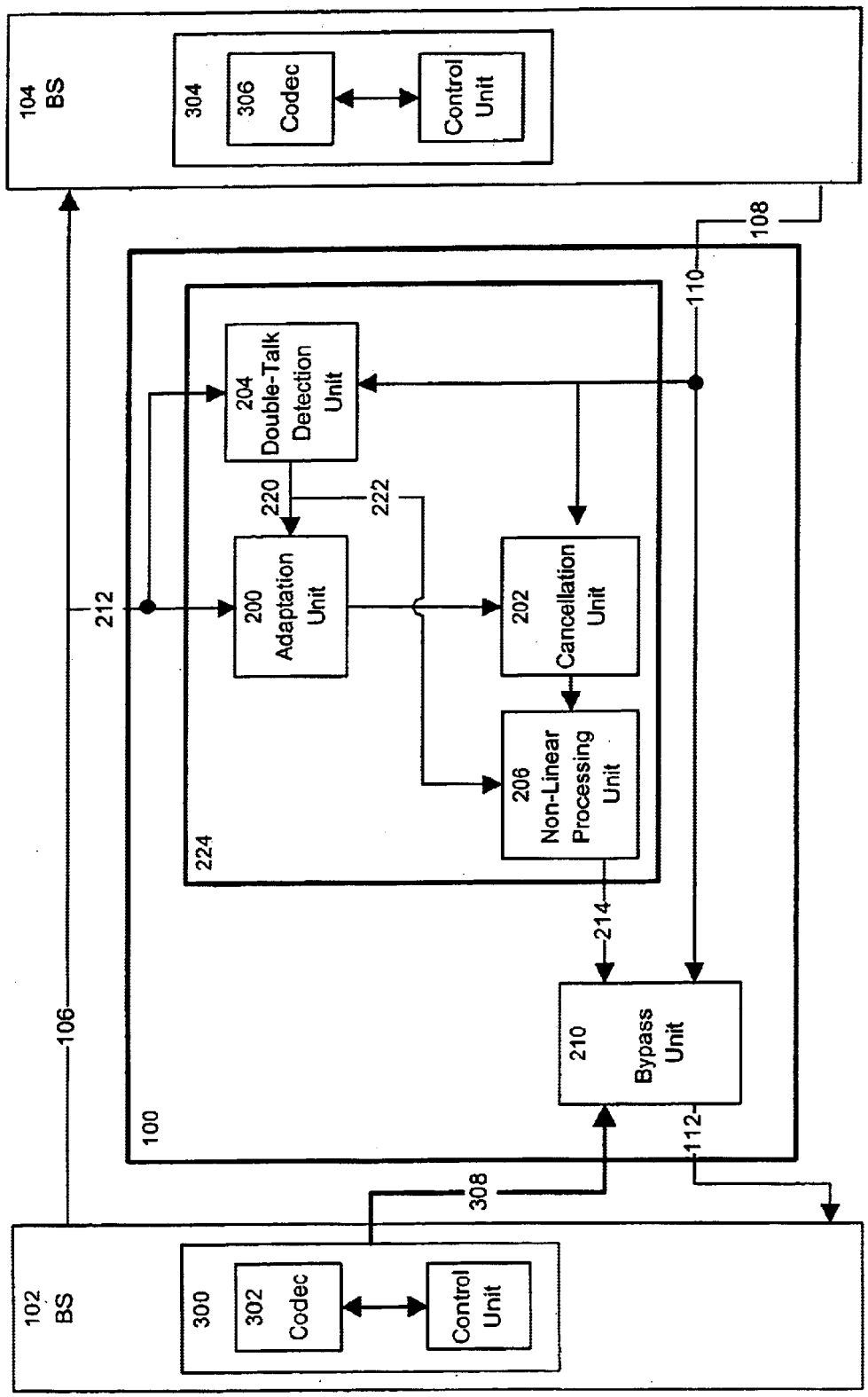
FIG. 3 is a functional block diagram of the echo cancellation device shown in FIG. 1, in accordance with a second embodiment of the present invention.

FIG. 3 depicts the echo canceller 100 in relationship with a digital signal processor 300 of the BS 102. When the codec 302 in the BS 102 becomes aware of the codec 306 in the BS 104, through the handshaking protocol exchanged by the digital signal processors 300 and 304, the digital signal processor 300 acquires the codec bypass mode and generates a BYPASS control signal for -transmission to the bypass unit 210 of the echo canceller 100 over link 308. This BYPASS control signal is indicative of the type of connection, notably a mobile-to-mobile connection. The bypass unit 210 of the control unit 226 is responsive to this BYPASS control signal to select the near-end voice signal 108 for release from the output 112 of the echo canceller 100, such the echo canceller 100 acquires the inactive operative mode. Note that in such an implementation, there is no need for the echo detection unit 208 as the control unit 226 is not required to assess the actual level of echo present in the near-end voice signal 108.

When the digital signal processor 300 exits the codec bypass mode, it generates a NON-BYPASS control signal for transmission to the bypass unit 210 of the echo canceller 100 over link 308. The bypass unit 210 is responsive to this NON-BYPASS control signal to select the echo-attenuated signal 214 for release from the output 112 of the echo canceller 100, such that the echo canceller 100 re-acquires the active operative mode.

Note that the echo canceller 100, as described above in the examples of implementation of the present invention, may be implemented on a DSP chip or, alternatively, in software.

The above description of a preferred embodiment under the present invention should not be read in a limitative manner as refinements and variations are possible without departing from the spirit of the invention. The scope of the invention is defined in the appended claims and their equivalents.

We claim:

1. An echo cancellation device for reducing a magnitude of an echo occurring in a voice signal propagating in a channel of a communication system, said echo cancellation device being capable to selectively acquire an active operative mode and an inactive operative mode, in the active operative mode said echo cancellation device performing echo cancellation on the voice signal, in the inactive operative mode said echo cancellation device allowing propagation of the voice signal without performing echo cancellation, said echo cancellation device being responsive to a condition indicative of a level of echo occurring in the voice signal to selectively acquire said active or said inactive operative mode.

2. An echo cancellation device as defined in claim 1, wherein said echo cancellation device comprises:
   a first input for receiving a far-end voice signal from the communication channel;
   a second input for receiving a near-end voice signal from the communication channel, the near-end voice signal potentially containing echo, the far-end voice signal being a precursor of the echo in the near-end voice signal;
   an output coupled to the communication channel;
   an echo cancellation unit for processing the far-end voice signal to perform echo cancellation on the near-end voice signal to generate an echo-attenuated voice signal;
   a control unit operative to assess a level of echo in the near-end voice signal, said control unit being responsive to a condition in which a level of echo in the near-end voice signal is below a certain threshold to cause the near-end voice signal to be released from said output.

3. An echo cancellation device as defined in claim 2, wherein said echo cancellation unit is operative to process the far-end voice signal to generate an echo estimate signal.

4. An echo cancellation device as defined in claim 2, wherein said control unit is responsive to the echo estimate signal to assess the level of echo in the near-end voice signal.

5. An echo cancellation device as definers in claim 4, wherein the echo estimate signal includes filter coefficients, said control unit including an input to receive the filter coefficients, said control unit processing the filter coefficients to assess a level of echo in the near-end voice signal.

6. An echo cancellation device as defined in claim 5, wherein said control unit includes an echo detection unit for processing the filter coefficients to generate a control signal indicative of the magnitude of a level of echo in the near-end voice signal.

7. An echo cancellation device as defined in claim 6, wherein said control unit further includes a bypass unit for receiving said control signal from said echo detection unit, said bypass unit operative to process said control signal to determine if the level of echo in the near-end voice signal is below a certain threshold, when the level of echo is below the certain threshold said bypass control unit operative to cause said near-end voice signal to be released from said output, when the level of echo is above the certain threshold said bypass control unit operative to cause said echo-attenuated voice signal to be released from said output.

8. An echo cancellation device as defined in claim 7, wherein said bypass unit monitors said control signal for a certain period of time, if the magnitude of the level of echo in the near-end voice signal remains below the certain threshold for the duration of the certain period of time said bypass unit causing said near-end voice signal to be released from said output.

9. An echo cancellation device as defined in claim 1, wherein the condition indicative of a level of echo occurring in the voice signal is a type of connection established in the channel of the communication system to allow propagation of the voice signal.

10. An echo cancellation device as defined in claim 9, wherein the type of connection is a digital mobile to digital mobile connection.

11. An echo cancellation device as defined in claim 9, wherein the type of connection is a digital mobile to digital PBX termination connection.

12. A method for performing echo cancellation comprising:
   receiving a voice signal potentially containing echo;
   detecting a condition indicative of a level of echo present in the voice signal;
   a) if the condition is indicative of a level of echo that is below a certain threshold, allowing the voice signal to propagate without performing any echo cancellation;
   b) the condition is indicative of a level of echo that is above the certain threshold, performing echo cancellation on the voice signal.

* * * * *